May 7, 1940.  L. F. WHITNEY  2,199,975
CONTROL DEVICE
Filed April 14, 1938  4 Sheets-Sheet 1

Inventor,
Lyman F. Whitney
by Roberts, Cushman & Woodbury
Attys.

May 7, 1940.  L. F. WHITNEY  2,199,975
CONTROL DEVICE
Filed April 14, 1938  4 Sheets-Sheet 2
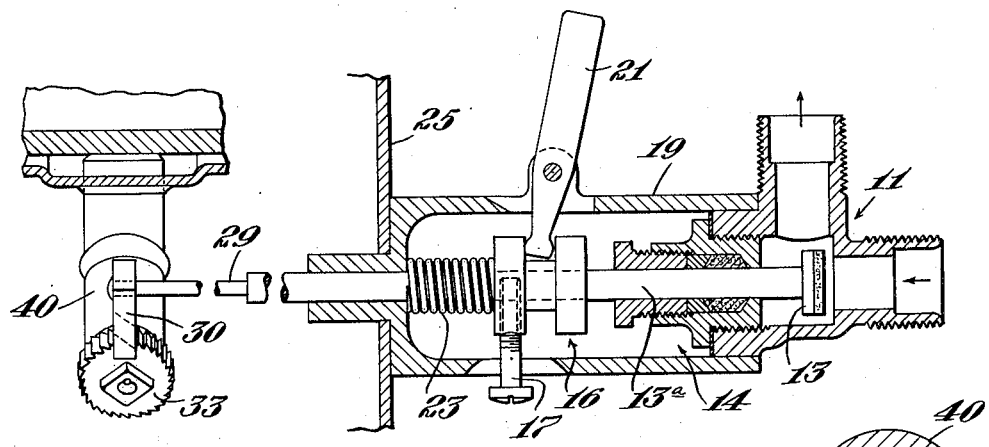
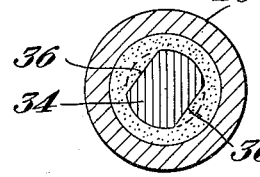
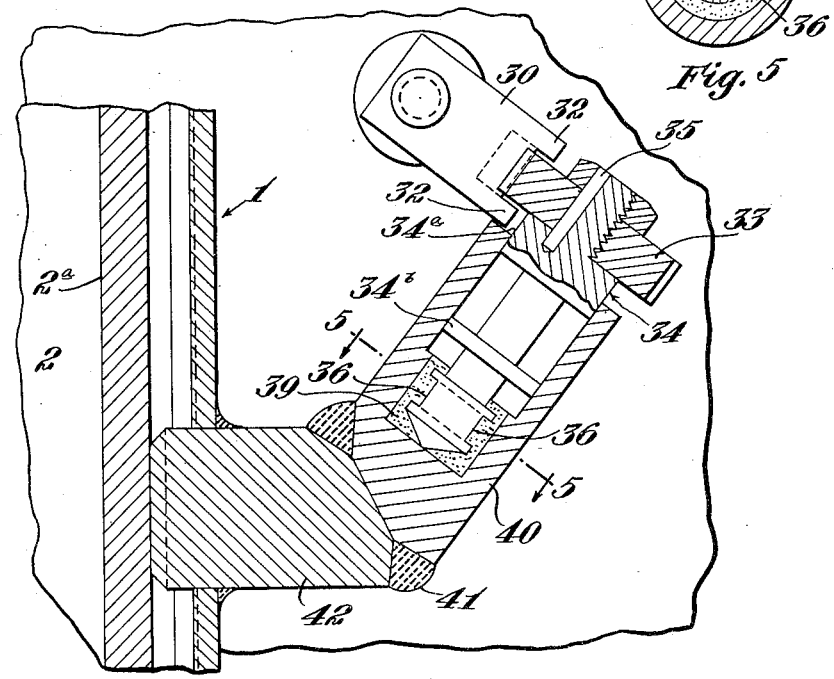
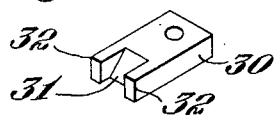
Inventor,
Lyman F. Whitney
by Roberts, Cushman & Woodbury
Attys.

May 7, 1940.　　　L. F. WHITNEY　　　2,199,975
CONTROL DEVICE
Filed April 14, 1938　　　4 Sheets-Sheet 3
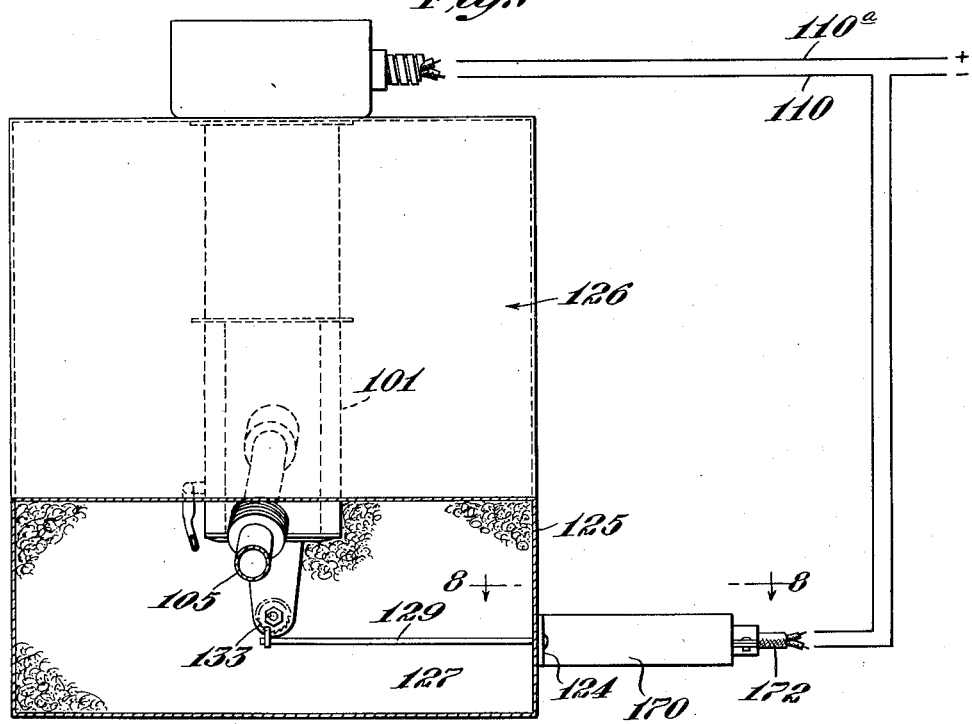
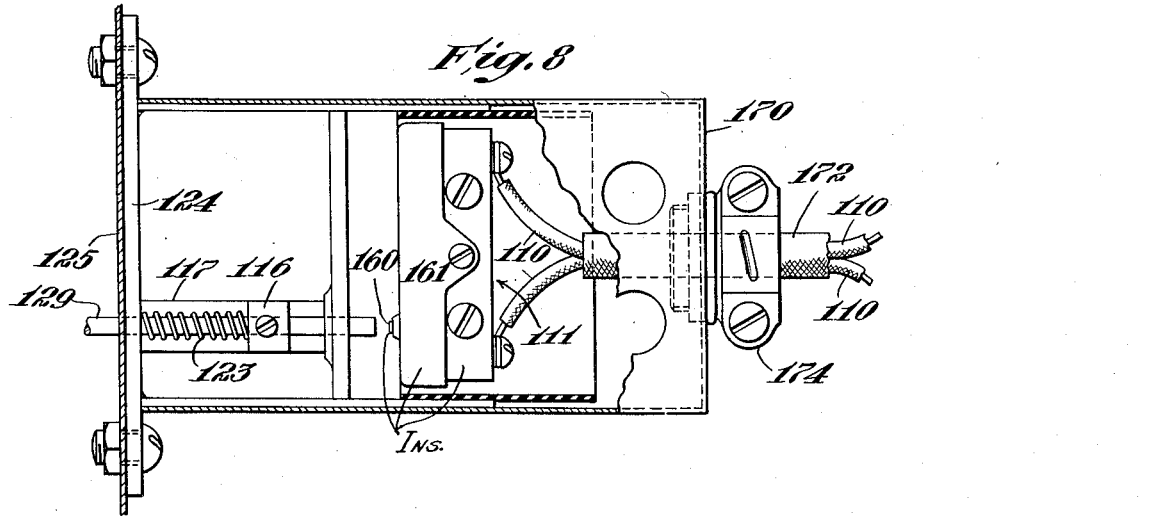
Inventor
Lyman F. Whitney
by Roberts, Cushman & Woodbury
Att'ys.

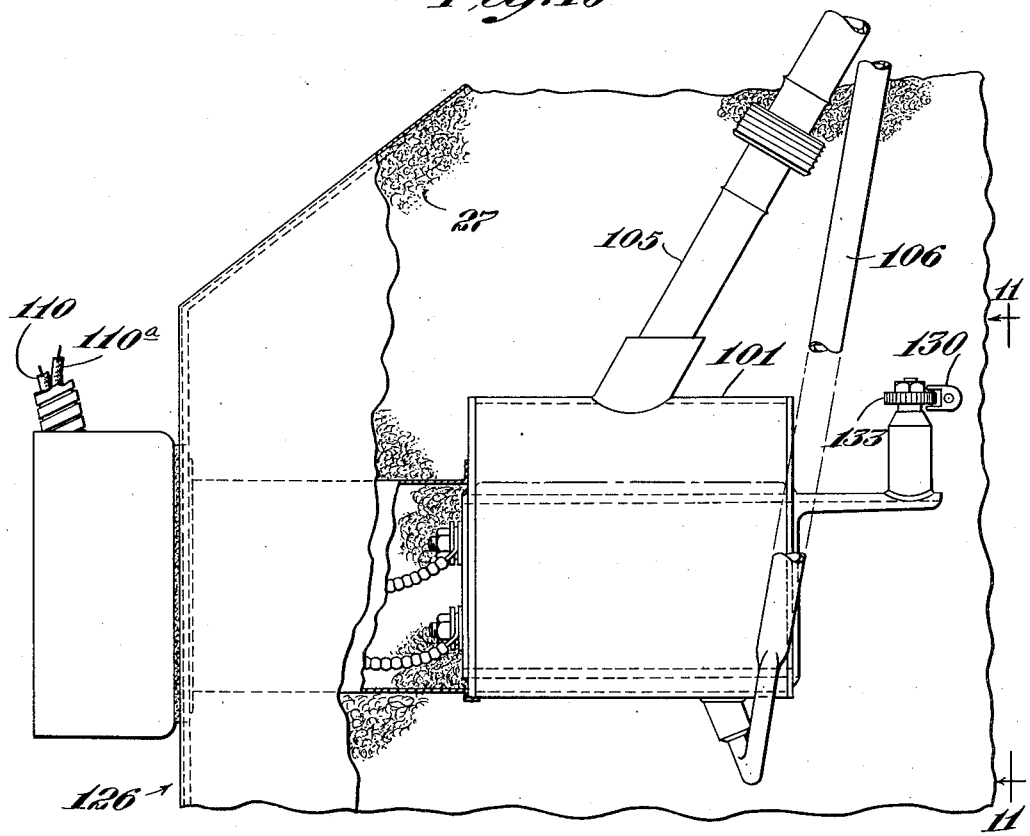
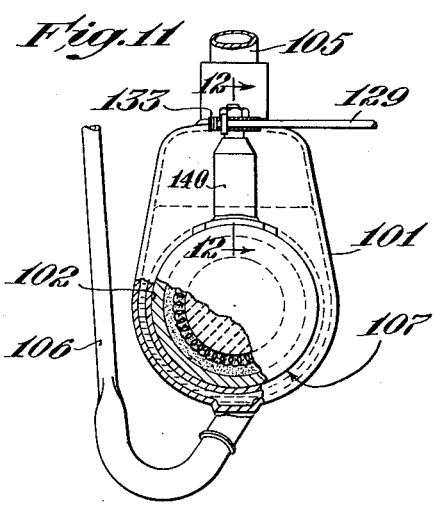
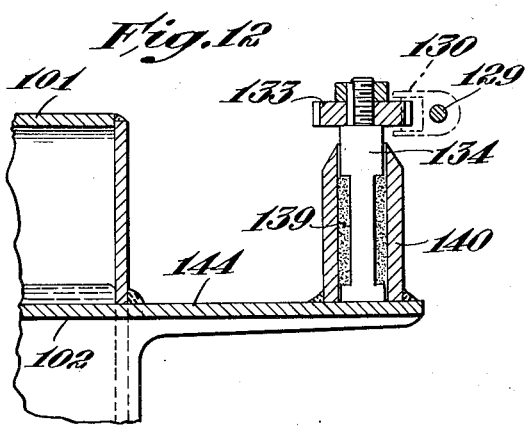

Patented May 7, 1940

2,199,975

UNITED STATES PATENT OFFICE 2,199,975

CONTROL DEVICE

Lyman F. Whitney, Cambridge, Mass., assignor, by mesne assignments, to Stator Corporation, a corporation of Rhode Island Application April 14, 1938, Serial No. 202,014

1 Claim. (Cl. 122—504.3)

This invention relates to safety control devices of the type which operate in response to the melting of material at an increased temperature. In accordance with this invention, such devices may be arranged so that they may be reset without necessity for remelting the material.

In certain systems, such as heat operated refrigerating systems, it is often desirable to provide a control device for automatically interrupting the supply of heat to a vaporizer or the like, when the temperature of the latter rises unduly. Such a device should operate, for example, if the vaporizer is denuded. Under such conditions a control device may be advantageously employed which operates in response to the melting of fusible material. Such a device does not permit resumption of fuel supply or the like until personal attention is given to the apparatus. It is, however, desirable to provide a control device of this type which may be manually reset without necessity for remelting the fusible material. Futhermore, such a device may often be desirably employed in association with a vaporizer and heater which are disposed in a heat insulating housing so that convenient access to the vaporizer and the fusible material is precluded.

In accordance with this invention, a suitable control device may be associated with the supply line for a heater, such as a fuel supply line for a burner or an electric supply line for an electrically energized heater. This control device may be arranged so that it automatically functions to interrupt the operation of the heater when the temperature of the part being heated, such, for example, as a vaporizer, rises to an unduly high point. For this purpose a body of fusible material preferably is located in good heat conductive relation to the vaporizer and arranged normally to lock the device to prevent interruption of the supply of gas or electricity to the heater. However, if the temperature of the vaporizer or the like should rise to an unduly high point, the fusible material melts to permit the automatic interruption of the supply of gas or electricity. For this purpose a suitable spring may be provided to cause the actuation of a fuel controlling valve or of an electrical switch. Preferably the switch or valve is associated with resetting mechanism located at a distance from the fusible material. Thus the fusible material may be juxtaposed to a vaporizer which is located in a heat insulating housing, while the valve and resetting mechanism may be located outside of the housing. In order to permit the convenient resetting of the device, suitable means is provided to extend between the resetting mechanism and the assembly which contains the fusible material. Such means may conveniently be in the form of a somewhat resilient rod. A ratchet pinion or the like may normally be held against rotation by the fusible material, and a pawl may be mounted on the connecting means or resilient rod and may normally engage the pinion. When the fusible material melts, rotation of the pinion is permitted, such rotation being caused by the stressed spring of the resetting mechanism which also causes closing of the valve in the fuel supply line or opening of the switch in the electrical supply line.

When the device is to be reset, the rod may be returned to its normal position, corresponding, for example, to the opened position of the gas valve, the resiliency of the rod permitting the pawl to move over the teeth of the ratchet pinion so that, although the pinion does not resume its original position, the rod and the resetting mechanism may be returned to their normal positions.

In the accompanying drawings:

Fig. 3 is a section on line 3—3 of Fig. 2, parts being broken away;

Fig. 4 is a section on line 4—4 of Fig. 2;

Fig. 5 is a section indicated by line 5—5 of Fig. 4;

Fig. 6 is an isometric view of the ratchet member of the control device;

Fig. 7 is a view similar to Fig. 1, but showing an optional arrangement employed with an electrically energizable heater;

Fig. 8 is a section on line 8—8 of Fig. 7, parts being broken away;

Fig. 9 is a sectional detail of the switch assembly shown in Fig. 8;

Fig. 10 is a side elevation of the boiler assembly and portions of the control device shown in Fig. 7, parts being broken away;

Fig. 11 is an end elevation of the boiler and a portion of the control device; and Fig. 12 is a section on line 12—12 of Fig. 11.

Figure 1:
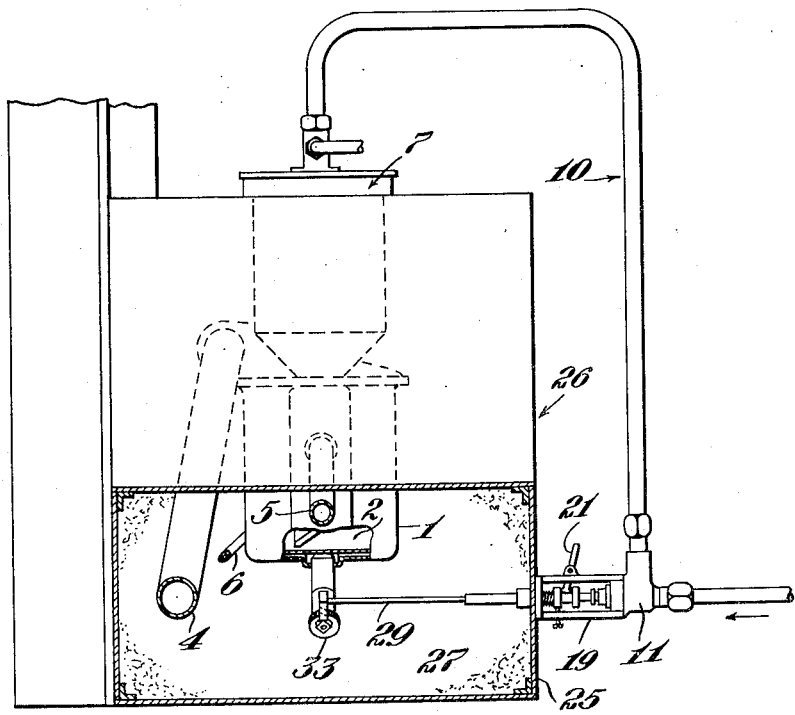
Fig. 1 is a top plan view of a gas heated boiler assembly having a safety control device constructed in accordance with this invention, certain parts being shown in section.
Figure 2:
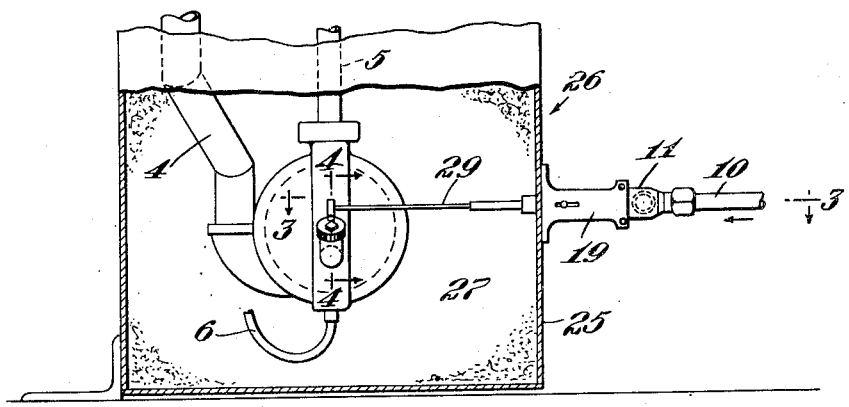
Fig. 2 is an elevational view of a portion of the device shown in Fig. 1, parts being broken away and shown in section.

Figs. 1 and 2 show a typical arrangement of a vaporizer assembly with which a control device of the present type may be associated. Such an assembly comprises a boiler 1 which may include a combustion chamber 2 and which may provide a jacket around this chamber to contain a body of liquid for vaporization. A boiler of this type is more fully disclosed in United States Patent No. 1,954,398, of Eastman A. Weaver et al. Such a boiler may conveniently be employed in a refrigerating system employing mercury as a propellant. This boiler may be provided with a stack 4 and with a vapor outlet duct 5 as well as a liquid return duct 6.

The boiler 1 may be provided with a suitable heater, such as a gas burner 7. Such a burner, for example, may be of the general type disclosed in United States Patent No. 1,885,530. This burner may receive gas through a supply line 10, between sections of which a valve housing 11 is disposed. This valve housing forms a portion of the control device of the present invention and is shown in greater detail in Fig. 3.

It is evident that the housing 11 is provided with a slidable valve 13 of the poppet type which, in its closed position, prevents the flow of fuel, such as gas, through the supply line 10 to the burner 7. The valve 13 is provided with a spindle 13ª which is slidably mounted in a packing assembly 14 and which carries a grooved collar member 16. The latter is secured to the spindle 13ª by a screw 17. The valve housing 11 is mounted on the end of a skeletonized support or housing 19 which affords a pivotal mounting for a short hand lever 21, the inner end of which is received in the grooved portion of the collar 16. The screw 17 extends through a slot in the housing 19 to prevent rotation of valve 13 and spindle 13ª. Collar 16 affords a shoulder engageable with one end of a compression spring 23, the opposite end of which engages an end wall of the housing 19. The latter may conveniently be mounted on the sheet metal wall 25 of a heat insulating housing 26. This housing preferably is of substantial size and contains discrete heat insulating material 27 which surrounds the vaporizer 1 and the major portion of the burner assembly 7.

The valve spindle 13ª preferably extends for a small distance into the housing 26 and has secured thereto a small-diametered, somewhat resilient rod 29. The inner end of this rod supports a pawl 30 of the form shown in Fig. 6, this pawl being provided with a beveled portion 31 between two block-like extensions 32. In its normal position the beveled portion of the pawl is engageable with the toothed periphery of a ratchet pinion 33, while the protuberances 32 are disposed at either side of this pinion (Fig. 4). The beveled portion 31 and the teeth of the pinion are arranged to have a cam-like engagement when the valve spindle 13ª and the rod 29 are moved inwardly. On the other hand, the movement of the rod and valve spindle in the opposite direction under the action of spring 23 is prevented by the ratchet wheel and pawl.

The pinion 33 is normally locked against rotation (Fig. 4). For this purpose, it may be mounted in threaded engagement with a spindle 34, a suitable pin 35 being arranged to lock the wheel against rotation relative to the spindle. The latter is mounted in a cup-like member 40 which provides a socket receiving a round portion 34ª of the spindle and a collar 34ᵇ thereon spaced from the portion 34ª. The inner end of the spindle is provided with planar surfaces 36 and is disposed within a body 39 of fusible material such as bichromate of potassium. At normal operating temperatures, this fusible material rigidly prevents rotation of the spindle 34 and of the ratchet wheel 33. Accordingly the valve 13 cannot move to its closed position under the influence of the stressed spring 23.

The member 40 is secured by welding 41 to a bar 42 which extends through the liquid-containing jacket of the boiler 1 into contact with the wall 2ª of the firebox 2. Thus the fusible material 39 is in excellent heat-conductive relation to the boiler and firebox. Accordingly, if, for example, the boiler is denuded, the temperatures of the members 42 and 40 immediately rise and the fusible material 39 melts. Thereupon the spring 23 causes rotation of the ratchet pinion 33 in a clockwise direction, as viewed in Fig. 3, and causes the valve 13 to move into engagement with its seat. Thus, when the boiler 1 is denuded, the device automatically operates to interrupt the supply of fuel to the burner 7.

It is evident that a control device of this type does not automatically permit resumption of fuel flow to the burner as soon as the boiler has cooled, but that personal attention must be given to the apparatus before normal operation can be resumed. After the system has been properly reconditioned for normal operation, the control device may be reset without necessity for obtaining access to the insulating housing 26. For this purpose the hand lever 21 may be actuated to move the valve 13 to its open position, to compress the spring 23, and to cause the pawl member 30 to move over the teeth of the ratchet wheel 33 with a cam-like action, it being evident that the beveled surface 31 of the pawl and the cooperating surfaces of the teeth permit such a relative movement of the parts. The resilient rod 29 permits the movement of the pawl 30 outwardly as it moves over the teeth of the ratchet pinion 33. Obviously when the device is reset in this manner, the ratchet pinion ordinarily may have turned from the position which it previously occupied, but the pinion has been relocked in its new position by the solidified material 39.

Fig. 7 illustrates a boiler assembly which may be employed when electrical energy is used for the heater. Figs. 10 and 11 show a boiler 101 which is provided with a vapor outlet duct 105 and with a liquid return duct 106. This boiler may be provided with a socket portion 102 of substantial diameter to receive an electric resistance element 107 in the form of a cartridge. The boiler 101 preferably is housed in an insulating housing 126 similar to the housing 26 described above, and similarly containing heat insulating material 127. The heating element 107 receives electrical energy through suitable electrical leads 110 and 110ª. The lead 110 may conveniently comprise sections which are connected through a switch assembly 111 (Fig. 8). Under normal conditions this switch is closed so that current can pass to the heater 107 and so that the vaporizer may function in the normal manner.

The switch assembly 111 is shown more particularly in Fig. 9 and comprises a button 160 slidably mounted in an insulating casing 161 and engageable with a snap spring 162. The latter may be bifurcated and laterally pinched, so that a slight pressure on the button 160 causes the spring to snap to separate the contacts of the switch assembly. The button 160 is juxtaposed to the end of a rod 129 corresponding to the rod 29 of Fig. 2. This rod carries a block 116 engageable with one end of a compression spring 123, the opposite end of which engages a plate 124 secured to the wall 125 of the insulating housing 126. The block 123 slidably engages a bar 117 to prevent rotation of rod 129.

The switch assembly 111 and the spring 125, as well as related parts, are disposed in a suitable frame or housing provided with a removable cover 170. This cover is provided with an opening through which the cable 172 extends, this cable carrying the sections of lead 110 which are connected to the switch assembly 111. A standard clamp 174 has a portion secured to the cover 170 and is also normally pinched on the cable 172 to prevent the movement of the cover along the cable. However, when this clamp is loosened, the cover may be slid along the cable to afford access to the end of the rod 129. The latter may then be actuated to compress the spring 123 while separating the rod from the button 160. As soon as the pressure on the button is relieved, the spring 162 snaps back to its normal shape to cause mutual engagement of the contacts of the switch assembly 11 and to permit the flow of current through the successive sections of the current supply line 110.

The inner end of the rod 129 carries a pawl member 130 which may be similar to the pawl member 30 and which may similarly engage a ratchet pinion 133. The latter is mounted on a spindle 134 (Fig. 12) having a section providing flattened surfaces engageable with a body 139 of fusible material in a cup-like housing 140. The latter is welded onto an integral extension 144 of the inner boiler shell or socket 102. Accordingly, when the vaporizer or boiler is denuded, the temperatures of the member 144 and the member 140 immediately rise so that the material 139 is melted and the ratchet pinion 133 can turn under the influence of spring 123. Such rotation of the pinion permits the rod 129 to move to the right as viewed in Fig. 8, causing the button 160 to snap the spring 162. Thereupon the switch 111 is opened to interrupt the supply of current to the heating element 107. Obviously the device does not permit automatic resumption of current supply without necessitating personal attention to the system. After such attention has been given to the system and it is again ready for normal operation, the clamp 174 may be loosened so that the cover 170 may be slid along the cable 172 away from the switch assembly 111. Thus the end of the rod 129 is uncovered and the latter may be moved endwise, permitting the return of the spring 162 to its normal position, compressing the spring 123, and causing the movement of the pawl 130 over the teeth of the now rigidly positioned pinion 133 until the pawl is locked in position.

One important feature of the present invention involves the provision of a heat conductor arranged so that the melting of the fusible material readily takes place when the vaporizer is denuded. The heat conductor is arranged so that it is in intimate heat-conductive relation to a part of the vaporizer which has a surface normally engaged by the liquid being vaporized but which is also in close heat transfer relation to the heater. Accordingly when the liquid level falls so that the surface of this part of the vaporizer is no longer cooled by the liquid, the temperature of this part rises rapidly and to a substantial extent, thus causing greatly increased heat flow through the conductor to the fusible material and the quick melting of the latter. It will be noted, for example, that the bar 42 (Fig. 4) extends to the wall 2ª, the outer surface of which normally is engaged by the liquid mercury in the vaporizer and the inner surface of which is exposed to the flame of the heater, while it will also be noted that the heat conductor 144 is an extension of the boiler shell 102 (Fig. 12), this shell having its outer surface normally in contact with the liquid mercury and its inner surface in direct juxtaposition to the heating cartridge 107.

It is evident that the present invention affords a safety control device operable to prevent the normal functioning of the controlled apparatus in response to the melting of fusible material. Such a control device may conveniently be associated with the supply line of the apparatus, such as the fuel supply line or an electrical supply line of a heater associated with a suitable vaporizer. The device requires personal attention to the apparatus before normal operation can be resumed, but permits resetting without necessity for access to the immediate vicinity of the vaporizer. Thus the latter may be disposed in a heat insulating housing of substantial size and yet the device may be reset without necessity for access to the interior of the housing.

It should be understood that the present disclosure is for the purpose of illustration only and that this invention includes all modifications and equivalents which fall within the scope of the appended claim.

I claim:

Apparatus of the class described comprising a mercury boiler, a heater for the boiler, a supply line for the heater, a shut-off device for the supply line operable to interrupt the operation of the heater, resilient means tending to cause operation of the device, a fusible body of bichromate of potassium in heat transfer relation to said boiler, a connection between said device and said body, said connection normally being locked by said body in a position to prevent operation of the device by said resilient means, the melting of the body resulting in release of the connection and the operation of the shut-off device under the influence of the resilient means.

LYMAN F. WHITNEY.